US008813119B2

(12) United States Patent
Le Meur et al.

(10) Patent No.: US 8,813,119 B2
(45) Date of Patent: Aug. 19, 2014

(54) METHOD FOR INSERTING AN ADVERTISING CLIP INTO A VIDEO SEQUENCE AND CORRESPONDING DEVICE

(75) Inventors: Olivier Le Meur, Talensac (FR); Alexandre Ninassi, Osse (FR); Fabrice Urban, Thorigne-Fouillard (FR)

(73) Assignee: Thomson Licensing, Issy-les-Moulineaux (FR)

( * ) Notice: Subject to any disclaimer, the term of this patent is extended or adjusted under 35 U.S.C. 154(b) by 545 days.

(21) Appl. No.: 12/586,422

(22) Filed: Sep. 22, 2009

(65) Prior Publication Data

US 2010/0199300 A1   Aug. 5, 2010

(30) Foreign Application Priority Data

Oct. 7, 2008   (FR) ...................................... 08 56779

(51) Int. Cl.
*H04N 7/10* (2006.01)
*H04N 7/025* (2006.01)

(52) U.S. Cl.
USPC ................... 725/32; 725/33; 725/34; 725/35; 725/36

(58) Field of Classification Search
USPC .......................... 725/32–36; 705/14.49, 14.5, 705/14.51–14.53, 14.55, 14.61–14.64, 705/14.66–14.67, 14.73
See application file for complete search history.

(56) References Cited

U.S. PATENT DOCUMENTS

2004/0093327 A1* 5/2004 Anderson et al. ................. 707/3
2005/0149968 A1* 7/2005 Konig et al. .................... 725/32
2006/0215922 A1* 9/2006 Koch et al. .................... 382/248
2007/0204310 A1 8/2007 Hua et al.
2009/0006382 A1* 1/2009 Tunkelang et al. ............... 707/5

FOREIGN PATENT DOCUMENTS

CN   1595970   3/2005

OTHER PUBLICATIONS

Guleryuz, O.G.: "A Nonlinear Loop Filter for Quantization Noise Removal in Hybrid Video Compression" Image Processing, 2005. ICIP 2005. IEEE International Conference on Genova, Italy Sep. 11-14, 2005, Piscataway, NJ, USA, IEEE, vol. 2, Sep. 11, 2005. pp. 1-4, XP002398390 ISBN: 978-0-7803-9134-5 the whole document.
Shay Har-Noy et al: "Adaptive In-Loop Prediction Refinement for Video Coding" Multimedia Signal Processing, 2007. MMSP 2007. IEEE 9th Workshop on, IEEE, PI, Oct. 1, 2007, pp. 171-174, XP031197804 ISBN: 978-1-4244-1273-0978 the whole document.

(Continued)

*Primary Examiner* — Yassin Alata
(74) *Attorney, Agent, or Firm* — Myers Wolin LLC (57) ABSTRACT

The present invention relates to a method for processing pictures intended to insert an advertising clip at a point, called insertion, between two pictures of a sequence of video pictures, called video sequence, comprising the following steps:
 generating a salience map representing the salience of the video sequence preceding the insertion point,
 generating, for each advertising clip of a set of advertising clips, a salience map,
 determining, for each advertising clip of said set of advertising clips, a degree of similarity between the salience map of the video sequence and the salience map of said advertising clip, said degree of similarity being representative of the comparison between the location of the salience zones on both said maps,
 selecting, among said set of advertising clips, the advertising clip having the highest degree of similarity, and
 inserting the advertising clip selected into the video sequence at the insertion point.

8 Claims, 4 Drawing Sheets

(56) References Cited

OTHER PUBLICATIONS

Rane, Shantanu D et al : "Structure and Texture Filling-In of Missing Image Blocks in Wireless Transmission and Compression Applications" IEEE Transactions on Image Processing, vol. 12, No. 3, Mar. 2003 pp. 296-303.

Guleryuz, O.G.: Nonlinear Approximation Based Image Recovery Using Adaptive Sparse Reconstructions and Iterated Denoising—Part I: Theory IEEE Transactions on Image Processing, vol. 15, No. 3, Mar. 2006 pp. 539-554.

Guleryuz, O.G.: Nonlinear Approximation Based Image Recovery Using Adaptive Sparse Reconstructions and Iterated Denoising—Part II: Adaptive Algorithms pp. 1-26.

Bertalmio Marcelo et al: "Simultaneous Structure and Texture Image Inpainting" IEEE Transactions on Image Processing, vol. 12, No. 8, Aug. 2003 pp. 882-889.

ITU-T Telecommunication Standardization Sector of ITU H.264 Series H:Audiovisual and Multimedia Systems Infrastructure of audiovisual services—Coding of moving video Advanced video coding for generic audiovisual services Mar. 2005.

Search Report dated Mar. 16, 2008.

Mei, T. et al., "VideoSense—Towards Effective Online Video Advertising", ACM International Conference on Multimedia (ACM MM), Augsburg, Germany, Sep. 1, 2007, pp. 1075-1084.

\* cited by examiner

METHOD FOR INSERTING AN ADVERTISING CLIP INTO A VIDEO SEQUENCE AND CORRESPONDING DEVICE

This application claims the benefit, under 35 U.S.C. §119, of European Patent Application No. 0856779 of 7 Oct. 2008.

FIELD OF THE INVENTION

The present invention relates to the insertion of clips or advertising sequences into a sequence of video pictures.

BACKGROUND OF THE INVENTION

With the arrival of the distribution of video content over the Internet, advertising is considered by the players of the domain such as Yahoo™, Google™ or Microsoft™ as a key element of growth. Different tools have been developed for this purpose to increase the visual impact of the inserted advertising in the video, while avoiding inconveniencing the spectators.

In particular, Microsoft™ has developed a tool called VideoSense described in the document entitled "VideoSense: a contextual video advertising system", Proceedings of the 15th international conference on Multimedia, pp 463-464, 2007. This tool was created to insert advertising clips into a video sequence, the objective being to select a clip that is relevant to the video sequence and insert it at key moments in the video, not only at the start and end of the video sequence. To select the clip to insert, low-level parameters of the colour, movement or sound rhythm type are extracted form the clip and the sequence, then compared with each other, the clip selected then being the one having the low-level parameters closest to those of the video sequence. Additional information, such as a title associated with the clip or with the sequence and supplied by the advertisers or the broadcaster of video content or text information contained in the clip or the sequence, are also used to select the clip to insert into the sequence. Once selected, the clip is inserted at particular points of the sequence, and more specifically at points of the sequence for which the discontinuity is high and at which the attractiveness is low, for example at the end of a scene or a shot not comprising any movement.

Figure 1:
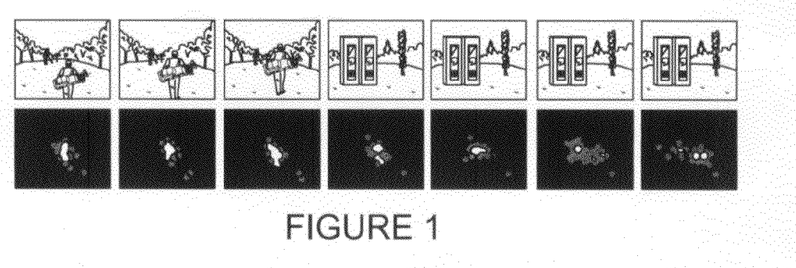
FIG. 1, already described, illustrates the phenomenon of temporal extension after a shot change in a video sequence.

The selected clip is therefore generally placed after a shot change. Although the video content of the selected clip is related to the content of the sequence in which it is inserted, the impact of this shot change on the perception of the clip by the spectator is neglected. Indeed, a phenomenon observed by several studies, particularly in the document entitled "Predicting visual fixations on video based on low-level visual features" by O. Le Meur, P. Le Callet and D. Barba, Vision Research, Vol. 47/19 pp 2483-2498, September 2007, on the temporal extension of the fixated zone after a shot change is not taken into account. The result of these studies is that the spectator continues to fixate, for an approximate time of 200 to 300 ms after the shot change, the area that he was fixating before the shot change. Hence, the area looked at by the spectator depends, not on the pictures displayed at the current time, but on pictures displayed previously. This phenomenon is illustrated by FIG. 1. The line of pictures in the upper part of the figure represented by a video sequence comprising 7 pictures separated from each other by a time interval of 100 ms. A shot change occurs between the third and fourth picture of the sequence. The line of pictures in the is lower part of the figure shows, by white dots, the picture areas fixated by the spectator. It is noted that the spectator only shifts his fixation at the end of the sixth picture, namely 2 pictures after the shot change. This temporal extension is due to different factors, particularly to the temporal masking, to the surprise effect and to the time biologically necessary to reinitialise the action of perception. In the case of a 50 Hz video, this temporal extension lasts for about 15 pictures after the shot change.

If the interesting regions of the advertising are not positioned at the same points as those of the video sequence before the shot change, the content of the advertising is therefore not immediately perceived by the spectator and the visual impact of the advertising on the spectator is therefore reduced. There is no direct perception of the message carried by the advertising.

SUMMARY OF THE INVENTION

One purpose of the present invention is to optimise the visual impact of an advertising clip inserted into a video sequence.

For this purpose, it is proposed according to the invention to account for, in the selection process of the advertising clip to insert, the regions of interest of the video sequence and of the advertising clip in such a manner that there is a continuity between the regions of interest of the pictures of the video sequence and the regions of interest of the advertising clip. The content of the clip will be more rapidly perceived by the spectator.

The present invention therefore relates to a method for processing pictures intended to insert an advertising clip at a point, called insertion point, between two pictures of a sequence of video pictures, called video sequence, comprising the following steps:
  generating a salience map representing the salience of the video sequence before said insertion point,
  generating, for each advertising clip of a set of advertising clips, a salience map,
  determining, for each advertising clip of said set of advertising clips, a degree of similarity between the salience map of the video sequence and the salience map of said advertising clip; said degree of similarity being representative of the comparison between the location of the salience zones on both said maps,
  selecting, among said set of advertising clips, the advertising clip having the highest degree of similarity, and
  inserting the advertising clip selected into the video sequence at the insertion point.

Hence, the inserted advertising clip is the one providing, at the level of the insertion point, the best continuity in terms of salience between the video sequence and the advertising clip.

According to particular embodiment, the insertion point is a point of the video sequence corresponding to a shot change in the video sequence.

According to a particular embodiment, the salience map representative of the salience of the video sequence before the insertion point is generated from the salience maps of the last n pictures of the video sequence that precede the insertion point, n being comprised between 1 and 50. For example, the average is made of the salience maps of the last 15 pictures of the video sequence before the insertion point in the case of a 50 Hz video.

According to one embodiment, the salience map of the advertising clip is generated from the salience maps of the first p pictures of the advertising clip, p being comprised between 1 and 50. For example, the average is made of the salience maps of the first 15 of the clip in the case of a 50 Hz video.

A clip is therefore selected providing a continuity in terms of salience between the last pictures of the video sequence before the insertion point and the start of the advertising clip.

According to a particular embodiment, the degree of similarity of an advertising clip is determined by calculating the correlation coefficient between the salience map of the video sequence and the salience map of said advertising clip, the degree of similarity thus being proportional to the correlation coefficient calculated.

According to another particular embodiment of the method of the invention, the degree of similarity for an advertising clip is determined by calculating the Kullback-Leibler divergence between the salience map of the video sequence and the salience map of said advertising clip, the degree of similarity thus being inversely proportional to the divergence calculated.

According to another particular embodiment, to determine the degree of similarity of an advertising clip, the following steps are carried out:
  selecting, from the salience map of the video picture and from the salience map of the advertising clip, the N most salient points of the map, called maximum salience points, said points being separated from each other by at least m points and ordered from the most salient to the least salient, N being greater than or equal to 1,
  determining, for each of the N maximum salience points of the salience map of the picture, the Euclidean distance between said point and the maximum salience point of the same order of the salience map of the advertising clip, and
  calculating the average of the N Euclidean distances determined, the degree of similarity thus being inversely proportional to the calculated average.

In this embodiment, the Euclidean distance being determined between the maximum salience points of the same order, the salience value of the points is, to a certain extent, taken into account in determining the degree of similarity.

According to a variant embodiment, the N maximum salience points are not ordered. In this embodiment, the determination of the degree of similarity of an advertising clip comprises the following steps:
  selecting, from the salience map of the video picture and from the salience map of the advertising clip, the N most salient points of the map, called maximum salience points, said points being separated from each other by at least m points, N being greater than or equal to 1,
  determining, for each of the N maximum salience points of the salience map of the video picture, the Euclidean distance between said point and the closest maximum salience point in the salience map of the advertising clip, and
  calculating the average of the N Euclidean distances determined, the degree of similarity thus being inversely proportional to the calculated average.

In these last two embodiments, the selection of N maximum salience points separated by at least m points in a salience map is carried out in the following manner:
  a) the point having the maximum salience is selected from said salience map,
  b) all the points belonging to a zone of radius R around said detected point are inhibited, R being equal to m points, and
  c) the steps a) and b) are repeated for the non-inhibited points of the salience map until the N maximum salience points are obtained.

The present invention also relates to device for processing pictures intended to insert an advertising clip at a point, called insertion, of a sequence of video pictures, called video sequence, comprising:
  means for generating a salience map representative of the salience of the video sequence before the insertion point and a salience map for each advertising clip of a set of advertising clips,
  means for determining, for each advertising clip of said set of advertising clips, a degree of similarity between the salience map of the video sequence and the salience map of said advertising clip.
  means for selecting, among said set of advertising clips, the advertising clip having the highest degree of similarity, and
  means for inserting the advertising clip selected into the video sequence at said insertion point.

According to a particular embodiment, the device further comprises means for detecting a shot change in the video sequence, the selected advertising clip thus being inserted at the point of the video sequence corresponding to this shot change.

BRIEF DESCRIPTION OF THE DRAWINGS

The invention will be better understood, and other purposes, details, characteristics and advantages will appear more clearly during the following detailed explanatory description of several currently preferred particular embodiments of the invention, with reference to the annexed diagrammatic drawings, wherein.

DETAILED DESCRIPTION OF PREFERRED EMBODIMENTS

In the rest of the description, advertising clip is understood to mean a series of fixed or animated pictures displaying an advert or a logo and insertion point is understood to mean the point between two pictures of the video sequence into which the advertising clip is inserted.

According to the invention, the regions of interest of the last pictures of the video sequence before the insertion point and the regions of interest of the advertising clips of a predefined set of advertising clips are determined and the advertising clip having the regions of interest spatially closest to those of the last pictures of the video sequence before the insertion point are selected. This insertion point can be predefined or be manually defined at the start of the method by an operator or be defined automatically at the start of the method.

The insertion point is advantageously a point of the video sequence corresponding to a shot change so that the spectator is not inconvenienced or disturbed by the sudden appearance of an advertising clip in the video sequence.

Figure 2:
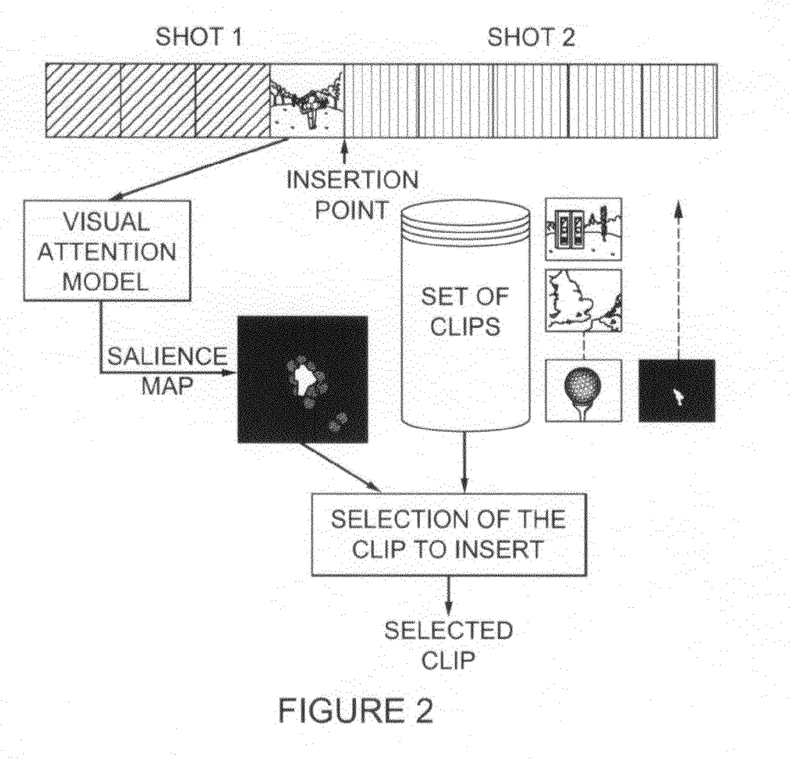
FIG. 2 shows a functional diagram of the method of the invention.

FIG. 2 is a functional diagram of the method of the invention in which the insertion point (point of the video sequence in which the advertising clip is inserted) corresponds to a shot change. According to the invention, the regions of interest of the last pictures of the video sequence before the shot change and the regions of interest of the advertising clips of a predefined set of advertising clips are determined and the advertising clip having the regions of interest spatially closest to those of the last pictures of the video sequence before the shot change are selected. The location of this shot change can be contained in metadata associated with the video sequence or defined at the start of the method. The shot change can be detected automatically, for example by an algorithm such as the one described in the document "Information Theory-Based Shot Cut/Fade Detection and Video Summarization" by Z. Cerneková, I. Pitas and C. Nikou, IEEE transactions on circuits and systems for video technology, Vol. 16, no. 1, January 2006) or selected manually by an operator.

Figure 3:
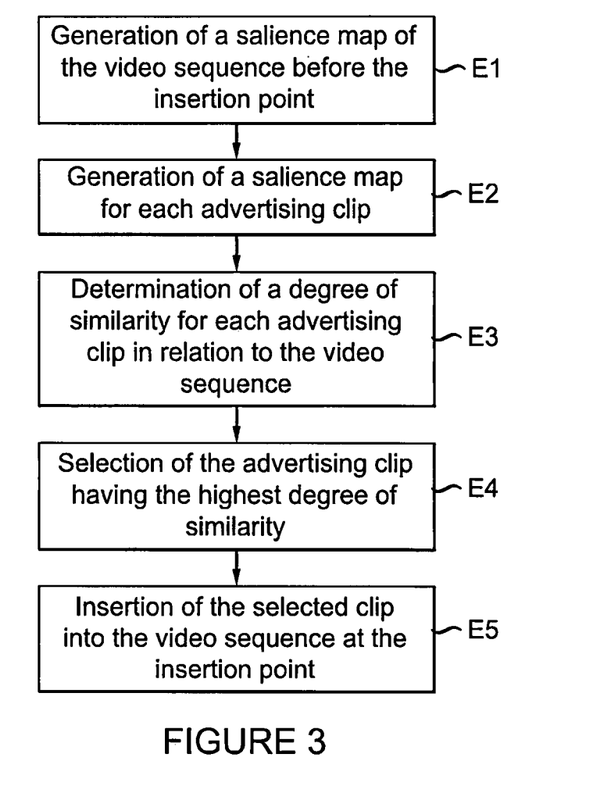
FIG. 3 is a flowchart showing the steps of the method of the invention.

FIG. 3 more particularly illustrates the steps of the method of the invention. According to a first step E1, a salience map is generated representing the salience of the video sequence before the said insertion point. This salience map is for example the salience map of the last picture of the sequence before the insertion point or then the average of the salience maps of the last n pictures of the sequence before the insertion point. The methods for generating the salience maps are fully known by those skilled in the art. Such a method is for example described in the patent application EP 1,544,792. Such a map associates each pixel of the video picture with a point having a given salience value. The higher the salience value of the point, the greater the interest of the associated pixel and the more this pixel attracts the attention of the spectator. The salience value of the points is for example comprised between 0 and 255 (8 bits).

According to a step E2, a salience map is then generated for each of the advertising clips of the set of clips. This salience map is advantageously defined from the first pictures of the advertising clip, for example from the p first pictures. The salience map of a clip is for example the average of the salience maps of the p first pictures of this clip.

According to the next step, referenced E3, for each advertising clip, a degree of similarity is determined between the salience map of the video sequence and the salience map of the advertising clip.

This degree of similarity can be determined in different manners.

According to a first embodiment, the step E3 consists in calculating, for each advertising clip, the correlation coefficient between the salience map of the video sequence and the salience map of the advertising clip, the degree of similarity thus being proportional to the correlation coefficient calculated.

According to a second embodiment, the step E3 consists in calculating, for each advertising clip, the Kullback-Leibler divergence between the salience map of the video sequence and the salience map of the advertising clip, the degree of similarity thus being proportional to the divergence calculated.

According to a third particular embodiment, the step E3 consists in carrying out, for each advertising clip, the following sub-steps:

(a) in the salience map of the video sequence and in the salience map of the advertising clip, a selection is made of the N most salient points of the map, called maximum salience points, the points being separated from each other by at least m points and ordered from the most salient to the least salient; to achieve this, a selection is first made of the point having the maximum salience in the salience map; then, a zone of m points surrounding the detected point is inhibited; among the non-inhibited points of the salience map, the point having the maximum salience is then detected and all the points belonging to a radius R equal to m points around this maximum salience point are inhibited; the operation is repeated until the N maximum salience points are obtained; N points are thus obtained in the salience map of the video sequence and N points in the salience map of the advertising clip, (b) for each of the N maximum salience points of the salience map of the video picture, the Euclidean distance is then determined between said point and the maximum salience point of the same order of the salience map of the advertising clip, (c) the average of the N previously calculated Euclidean distances is calculated, the degree of similarity for the considered advertising clip thus being inversely proportional to the calculated average.

Figure 4:
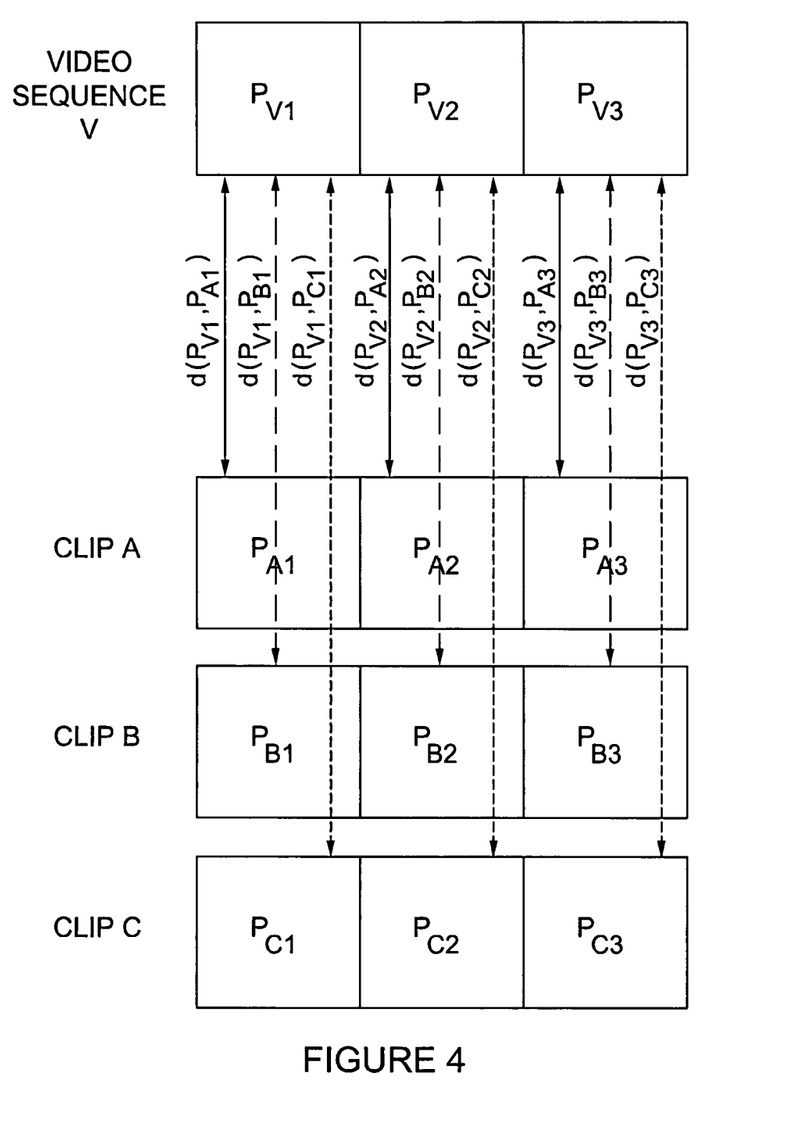
FIG. 4 illustrates the determination of a degree of similarity between the salience map of an advertising clip and the salience map of the video sequence according to a first embodiment.

This embodiment of the step E3 is illustrated by FIG. 4 for three advertising clips. In this figure, three maximum salience points (N=3) have been identified in the video sequence V and are noted $P_{V1}$, $P_{V2}$ and $P_{V3}$, with $S(P_{V1})>S(P_{V2})>S(P_{V3})$ where S(P) designates the salience value of the point P. Moreover, $P_{A1}$, $P_{A2}$ and $P_{A3}$ designate the three maximum salience points of an advertising clip A, with $S(P_{A1})>S(P_{A2})>S(P_{A3})$. Likewise, $P_{B1}$, $P_{B2}$ and $P_{A3}$ designate the three maximum salience points of an advertising clip B, with $S(P_{B1})>S(P_{B2})>S(P_{B3})$. Finally, $P_{C1}$, $P_{C2}$ and $P_{C3}$ designate the three maximum salience points of an advertising clip C, with $S(P_{C1})>S(P_{C2})>S(P_{C3})$.

According to this figure, the step E3 consists in calculating, for each clip, the Euclidean distance d between the points of the same order, namely $d(P_{Vi},P_{Ai})$, $d(P_{Vi},P_{Bi})$ and $d(P_{Vi},P_{Ci})$ with $i \in [1 \ldots 3]$, then in calculating, for each clip, the average of the 3 calculated distances and in deducing a degree of similarity for each of them, this degree being inversely proportional to the calculated average. The degree of similarity is for example the inverse of the calculated average.

According to an embodiment that is a variant of the third embodiment, the maximum salience points selected are not ordered. Step E3 thus consists in carrying out, for each advertising clip, the following sub-steps:

(a) in the salience map of the video sequence and in the salience map of the advertising clip, a selection is made of the N most salient points of the map, the points being separated from each other by at least m; as for the previous embodiment, a selection is first made of the point having the maximum salience in the salience map; then, a zone of m points surrounding the detected point is inhibited; among the non-inhibited points of the salience map, the point having the maximum salience is then detected and all the points belonging to a radius R equal to m points around this maximum salience point are inhibited; the operation is repeated until the N maximum salience points are obtained; N points are thus obtained in the salience map of the video sequence and N points in the salience map of the advertising clip, (b) for each of the N maximum salience points of the salience map of the video picture, the Euclidean distance is then determined between said point and the closest maximum salience point of the salience map of the advertising clip, (c) the average of the N previously calculated Euclidean distances is calculated, the degree of similarity for the considered advertising clip thus being inversely proportional to the calculated average.

Figure 5:
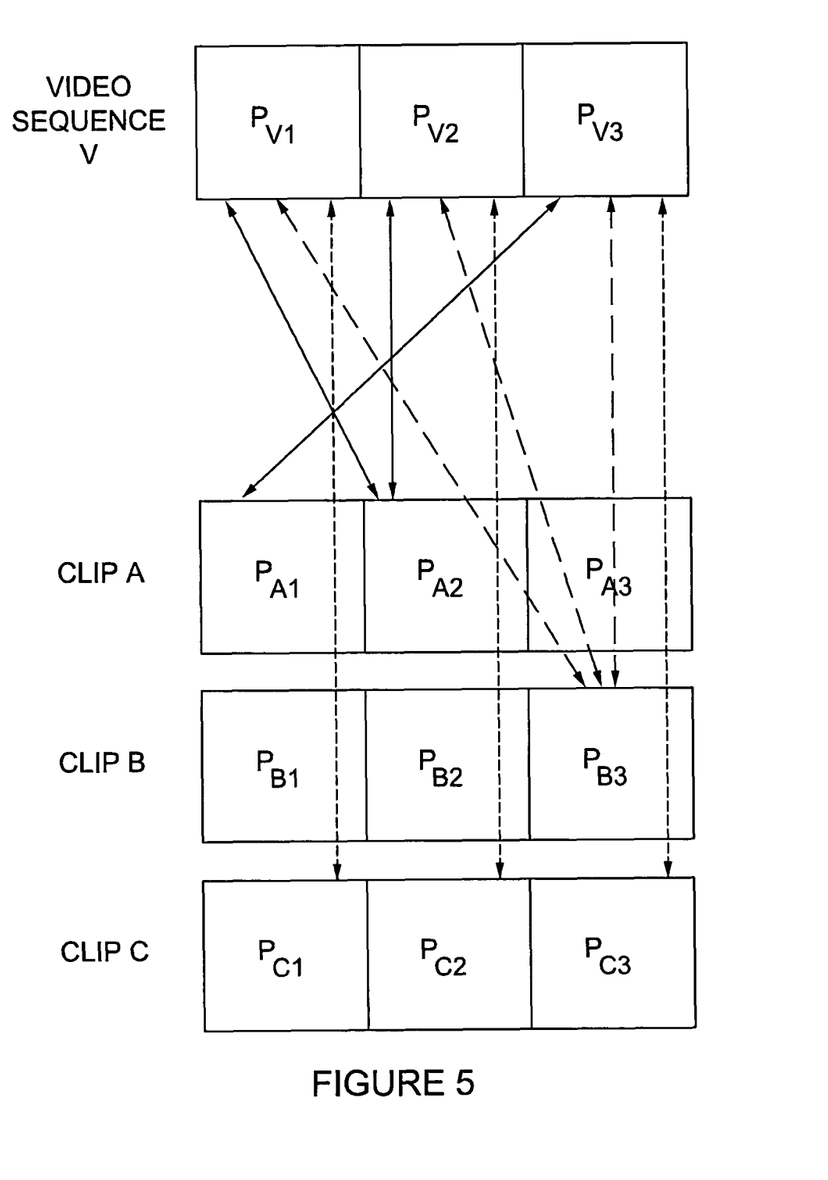
FIG. 5 illustrates the determination of a degree of similarity between the salience map of an advertising clip and the salience map of the video sequence according to another embodiment, and FIG. 6 diagrammatically shows a device capable of implementing the method of the invention.

This variant embodiment is illustrated by FIG. 5 for three advertising clips. This figure uses the maximum salience points defined for FIG. 4. According to this embodiment, for each point $P_{Vi}$ of the video sequence, a calculation is made of its Euclidean distance d with each of the maximum salience points of each clip and only the smallest distance is kept. For example, in FIG. 5, for the clip A, the point $P_{A2}$ is closest to the point $P_{V1}$, the point $P_{A2}$ is closest to the point $P_{V2}$ and the point $P_{A1}$ is closest to the point $P_{V3}$. Hence, for clip A, the average of the distances $d(P_{V1},P_{A2})$, $d(P_{V2},P_{A2})$ and $d(P_{V3},P_{A1})$ is calculated. In the same manner, by referring again to FIG. 5, a calculation is made, for the clip B, of the average of the distances $d(P_{V1},P_{B3})$, $d(P_{V2},P_{B3})$ and $d(P_{V3},P_{B3})$ and, for the clip C, of the average of the distances $d(P_{V1},P_{C1})$, $d(P_{V2},P_{C2})$ and $d(P_{V3},P_{C3})$. From these, a degree of similarity is thus deduced for each of the three clips that is inversely proportional to the calculated average. The degree of similarity is for example the inverse of the calculated average.

Naturally, any other method making it possible to calculate the similarity between the salience map of the video sequence and the salience map of the advertising clip can be used to implement the step E3.

By referring again to FIG. 3, the next step, referenced E4, consists in selecting, from all the advertising clips, the clip having the highest degree of similarity.

Finally, the advertising clip selected is inserted at a step E5 into the video sequence at the insertion point of the video sequence. At the end of the method, an enhanced video sequence is obtained in which an advertising clip has been inserted.

Naturally, the selection of the advertising clip to insert can be more complex and combined with other selection processes. The clips contained in the set of advertising clips can already have been preselected according to their semantic content with respect to that of the video sequence into which it has been inserted. For example, a first preselection of clips can have been made according to the theme of the video sequence or of the text and/or objects contained in the video sequence or also according to the profile of the spectator.

Figure 6:
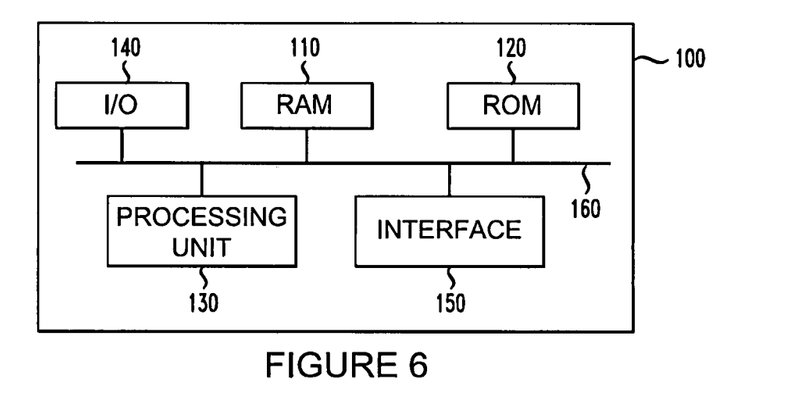

The present invention also relates to a device for processing pictures referenced 100 in FIG. 6 that implements the method described above. In this figure, the modules shown are functional units that may or may not correspond to physically distinguishable units. For example, these modules or some of them can be grouped together in a single component, or constitute functions of the same software. On the contrary, some modules may be composed of separate physical entities. Only the essential elements of the device are shown in FIG. 6. The device 100 notably comprises: a random access memory 110 (RAM or similar component), a read-only memory 120 (hard disk or similar component), a processing unit 130 such as a microprocessor or a similar component, an input/output interface 140 and possibly a man-machine interface 150. These elements are connected to each other by an address and data bus 160. The read-only memory contains the algorithms implementing the steps E1 to E5 of the method according to the invention. If the device is responsible for detecting a change in the video to sequence to insert an advertising clip into it, the memory also contains an algorithm for detecting shot changes. When powered up, the processing unit 130 loads and runs the instructions of these algorithms. The random access memory 110 notably comprises the operating programs of the processing unit 130 that are responsible for powering up the device, as well as the video sequence to process and the advertising clips to insert into this video sequence. The function of the input/output interface 140 is to receive the input signal (the video sequence and the advertising clips), and output the enhanced video sequence into which the advertising clips was inserted. Possibly, the operator selects the shot change into which the advertising clip is to be inserted by means of the man-machine interface 160. The enhanced video sequence is stored in random access memory then transferred to read only memory to be archived with a view to possible future processing.

Although the invention has been described in relation to different particular embodiments, it is obvious that it is in no way restricted and that it comprises all the technical equivalents of the means described together with their combinations if the latter fall within the scope of the invention. Notably, the advertising clip can be inserted at points of the videos sequence that are not shot changes. The clip can for example be inserted at a specific point of the sequence defined in the metadata accompanying the video sequence. It can also possibly be inserted at regular intervals of time into the sequence.

What is claimed is:

1. A method for inserting an advertising clip at an insertion point, between two pictures of a sequence of video pictures, called video sequence, said method comprising:
   generating a salience map representing the salience of the video sequence only before said insertion point, said insertion point of the video sequence corresponding to a shot change in said video sequence;
   generating, for each advertising clip of a set of advertising clips, a salience map;
   determining, for each advertising clip of said set of advertising clips, a degree of similarity between the generated salience map of the video sequence before the insertion point and the generated salience map of said advertising clip, wherein determining the degree of similarity for the advertising clip comprises:
      selecting, from the salience map of the video picture and from the salience map of the advertising clip, the N most salient points of the map, called maximum salience points, said points being separated from each other by at least m points, N being greater than or equal to 1,
      determining, for each of the N maximum salience points of the salience map of the video picture, the Euclidean distance between said point and the maximum salience point in the salience map of the advertising clip, and
      calculating the average of the N Euclidean distances determined, the degree of similarity for said advertising clip thus being inversely proportional to the calculated average, said degree of similarity being representative of the comparison between the location of salience zones on both said salience maps;
   selecting, among said set of advertising clips, the advertising clip having the highest degree of similarity; and
   inserting the advertising clip selected into the video sequence at the insertion point.

2. The method according to claim 1, wherein the salience map representative of the salience of the video sequence is generated from the salience maps of the last n pictures of the video sequence preceding the insertion point, n being comprised between 1 and 50.

3. The method according to claim 1, wherein the salience map of an advertising clip is generated from the salience maps of the first p pictures of the advertising clip, p being comprised between 1 and 50.

4. The method according to claim 1, wherein, to determine the degree of similarity for an advertising clip, the correlation coefficient between the salience map of the video sequence and the salience map of said advertising clip is calculated, the degree of similarity thus being proportional to the correlation coefficient calculated.

5. The method according to claim 1, wherein, to determine the degree of similarity for an advertising clip, the Kullback-Leibler divergence between the salience map of the video sequence and the salience map of said advertising clip is calculated, the degree of similarity thus being inversely proportional to the divergence calculated.

6. The method according to claim 1, wherein, to determine the degree of similarity of an advertising clip further comprises, the following steps are carried out:
   selecting, from the salience map of the video picture and from the salience map of the advertising clip, the N most salient points of the map, called maximum salience points, said points being separated from each other by at least m points and ordered from the most salient to the least salient, N being greater than or equal to 1,
   determining, for each of the N maximum salience points of the salience map of the video picture, the Euclidean distance between said point and the closest maximum salience point of the same order of the salience map of the advertising clip, and
   calculating the average of the N Euclidean distances determined, the degree of similarity for said advertising clip thus being inversely proportional to the calculated average.

7. The method according to claim 6, wherein, to select the N maximum salience points separated by at least m points in a salience map, the following steps are carried out:
   selecting the point having the maximum salience from said salience map,
   inhibiting all the points belonging to a zone of radius R around said detected point, R being equal to m points, and
   repeating the selecting and inhibiting steps for the non-inhibited points of the salience map until the N maximum salience points are obtained.

8. A device for inserting an advertising clip at an insertion point between two pictures of a sequence of video pictures, called video sequence, wherein the device comprises:
   means for generating a salience map representative of the salience of the video sequence only before the insertion point and a salience map for each advertising clip of a set of advertising clips, wherein the insertion point of the video sequence corresponds to a shot change in the video sequence;
   means for determining, for each advertising clip of said set of advertising clips, a degree of similarity between the generated salience map of the video sequence only before the insertion point and the generated salience map of said advertising clip, wherein determining the degree of similarity for the advertising clip comprises:
      selecting, from the salience map of the video picture and from the salience map of the advertising clip, the N most salient points of the map, called maximum salience points, said points being separated from each other by at least m points, N being greater than or equal to 1,
      determining, for each of the N maximum salience points of the salience map of the video picture, the Euclidean distance between said point and the maximum salience point in the salience map of the advertising clip, and
      calculating the average of the N Euclidean distances determined, the degree of similarity for said advertising clip thus being inversely proportional to the calculated average, said degree of similarity being representative of the comparison between the location of salience zones on both said salience maps;
   means for selecting, among said set of advertising clips, the advertising clip having the highest degree of similarity; and
   means for inserting the advertising clip selected into the video sequence at the insertion point.

* * * * *